(12) United States Patent
Elpern

(10) Patent No.: US 7,165,936 B2
(45) Date of Patent: Jan. 23, 2007

(54) ADJUSTABLE FLOW TURBINE NOZZLE

(75) Inventor: David G. Elpern, Los Angeles, CA (US)

(73) Assignee: Honeywell International, Inc., Morristown, NJ (US)

( * ) Notice: Subject to any disclaimer, the term of this patent is extended or adjusted under 35 U.S.C. 154(b) by 162 days.

(21) Appl. No.: 10/919,662

(22) Filed: Aug. 16, 2004

(65) Prior Publication Data
US 2006/0034683 A1   Feb. 16, 2006

(51) Int. Cl.
*F01D 25/02* (2006.01)
(52) U.S. Cl. .................... 415/155; 415/202
(58) Field of Classification Search ............. 415/1, 415/151, 155, 157, 159, 165, 167, 202, 208.3, 415/211.1; 60/805; 251/218; 138/46
See application file for complete search history.

(56) References Cited

U.S. PATENT DOCUMENTS

| | | | |
|---|---|---|---|
| 1,473,690 A * | 11/1923 | Wolner | 415/57.4 |
| 2,889,117 A * | 6/1959 | Wimpress | 239/124 |
| 4,378,960 A | 4/1983 | Lenz | |
| 4,535,592 A | 8/1985 | Zinsmeyer | |
| 4,579,507 A * | 4/1986 | Corrigan et al. | 415/150 |
| 4,586,336 A | 5/1986 | Hörler | |
| 4,973,223 A | 11/1990 | Franklin | |
| 5,683,225 A * | 11/1997 | Orlando et al. | 415/155 |
| 6,058,715 A * | 5/2000 | Strang et al. | 62/87 |
| 6,402,465 B1 | 6/2002 | Maier | |
| 6,652,224 B1 | 11/2003 | Mulloy et al. | |

* cited by examiner

*Primary Examiner*—Edward K. Look
*Assistant Examiner*—Nathan Wiehe
(74) *Attorney, Agent, or Firm*—Oral Caglar, Esq.

(57) ABSTRACT

A multiple-passage turbine nozzle with desired predetermined flow properties may be provided with an adjustment member in one or more of its passages to limit the flow therethrough. Turbine nozzle flow is an important performance characteristic that may be difficult to control by conventional drilling or machining manufacturing methods. The adjustment member may protrude into a nozzle passage, thereby reducing airflow through the nozzle passage. The amount of protrusion is variable and is selected to provide a desired partial or total occlusion of an associated passage at the time of manufacture of the turbine nozzle to compensate for variations produced by the conventional manufacturing techniques. The turbine nozzle according to the present invention provides simple and convenient calibrated adjustment of the predetermined flow that may be allowed to pass through a turbine nozzle onto a turbine wheel of a turbo machine.

20 Claims, 3 Drawing Sheets

ADJUSTABLE FLOW TURBINE NOZZLE

BACKGROUND OF THE INVENTION

The present invention generally relates to turbine nozzles and, more particularly, to variably adjustable flow turbine nozzles.

In an air cycle machine or other turbomachinery, a turbine may include a turbine nozzle at the turbine inlet that may channel the combustion gases between the turbine rotor blades that extract energy therefrom for powering the compressor.

Turbine nozzle flow is an important performance characteristic in most turbomachinery and specifically in an air cycle machine. It is difficult to manufacture drilled or machined nozzles that have small nozzle-to-nozzle variation. This difficulty results in significant rework and/or expensive manufacturing processes. Conventional turbine nozzles may be manufactured by first drilling or machining the nozzle flow passages, measuring the nozzle flow and adjusting the nozzle flow by extrude honing. A typical extrude honing process may, for example, pump clay and abrasive through the nozzle passageways to make the passages larger in size, thereby increasing nozzle flow. The airflow measurement step and the airflow adjustment step are repeated until the desired nozzle flow is achieved. Typically, nozzle flow must be controlled to within about +/−1%.

A variable geometry turbine has been disclosed in U.S. Pat. No. 6,652,224. The turbine described in the '224 patent has nozzle vanes that are displaceable across the turbine inlet flow path into slots. The vanes have cut-outs which reduce the vane cord and permit peak turbine efficiency over a range of geometries. Nozzle flow may be adjusted by controlling the axial position of a nozzle ring. Unfortunately, additional components, such as axially extending pins and stirrup members may be necessary to control the nozzle ring's axial position (col. 4, lines 1–17).

As can be seen, there is a need for an improved turbine nozzle and method for adjusting the flow through the turbine nozzle.

SUMMARY OF THE INVENTION

In one aspect of the present invention, a turbine nozzle comprises a plurality of nozzle passages; and at least one flow adjustment member in at least one of the plurality of nozzle passages, the flow adjustment member capable of providing an adjustable airflow through the turbine nozzle.

In another aspect of the present invention, an adjustable flow turbine nozzle for regulating airflow to a turbine wheel of a turbo machine comprises a plurality of nozzle passages; and a flow adjustment member in each of at least two of the nozzle passages, the flow adjustment member capable of providing an adjustable airflow through the turbine nozzle, the at least two of the nozzle passages being equally spaced about the adjustable flow turbine nozzle.

In still another aspect of the present invention, a drilled adjustable flow turbine nozzle comprises about 20 to about 60 nozzle passages; at least one flow adjustment member in at least one of the nozzle passages, each flow adjustment member capable of providing an adjustable airflow through the drilled adjustable flow turbine nozzle; and a cross-drilled hole in the drilled adjustable flow turbine nozzle, the hole communicating an exterior of the drilled adjustable flow turbine nozzle with one of the nozzle passages, the hole capable of receiving the flow adjustment member, wherein the hole forms an angle with the nozzle passage to which it communicates of less than 90 degrees.

In yet another aspect of the present invention, a vaned adjustable flow turbine nozzle comprises about 20 to about 60 nozzle passages formed as vanes on a surface of the vaned adjustable flow turbine nozzle; and at least one flow adjustment member in at least one of the vanes, each flow adjustment member capable of providing an adjustable airflow through the vaned adjustable flow turbine nozzle.

In another aspect of the present invention, a turbo-machine comprises a compressor wheel; a turbine wheel; a shaft rotationally connecting the compressor wheel with the turbine wheel; and a turbine nozzle for directing an airflow on the turbine wheel, the turbine nozzle having a plurality of nozzle passages and at least one flow adjustment member in at least one of the plurality of nozzle passages, each flow adjustment member capable of providing an adjustable airflow through the turbine nozzle In a further aspect of the present invention, a method for regulating airflow onto a turbine wheel of a turbo machine comprises passing the airflow through a turbine nozzle to provide a regulated airflow, the turbine nozzle having a plurality of nozzle passages and at least one flow adjustment member in at least one of the plurality of nozzle passages, the flow adjustment member capable of providing an adjustable airflow through the turbine nozzle; and directing the regulated air to contact the turbine wheel.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides an adjustable flow turbine nozzle having at least one flow adjustment member for providing a regulated airflow therethrough. The present invention further provides a method for regulating airflow onto a turbine wheel of a turbo machine by providing at least one flow adjustment member in a turbine nozzle airflow path. The turbine nozzle may be a drilled nozzle, having air passages drilled therethrough. Alternatively, the turbine nozzle may be a vaned nozzle, having vanes therein for directing airflow. The adjustable flow turbine nozzle may be useful on any turbine machine, including an air cycle machine and a gas turbine engine.

Unlike conventional turbine nozzles that may rely on accurate machining and/or drilling for proper airflow, the adjustable flow turbine nozzle of the present may use one or more flow adjustment members, such as an adjustment screw, to regulate the air flow through the turbine nozzle.

Thus, airflow may be adjusted simply, without requiring additional reworking of the turbine nozzle.

Figure 1:
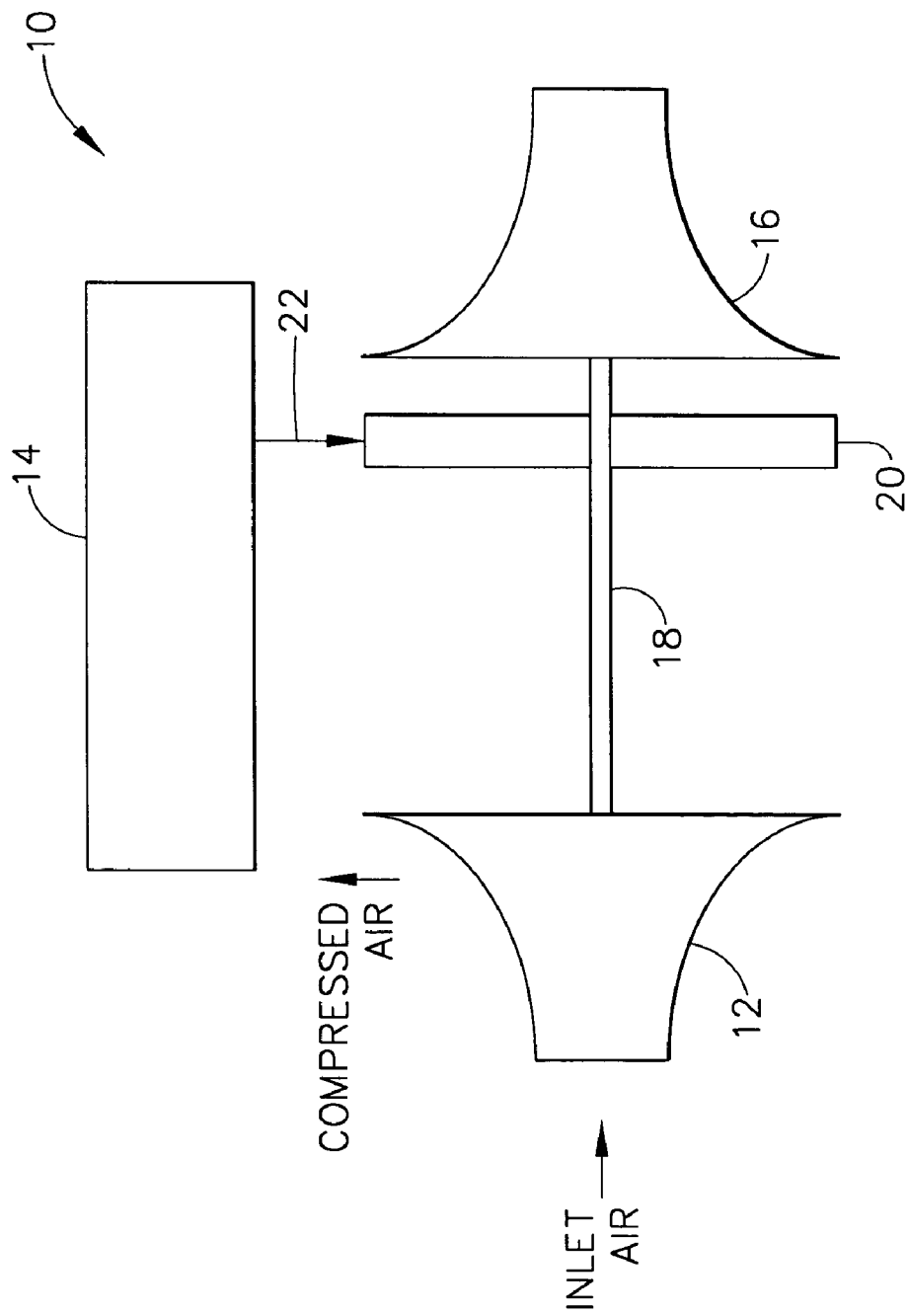
FIG. 1 is a schematic diagram of an air cycle machine having a turbine nozzle according to an embodiment of the present invention.

Referring to FIG. 1 there is shown a schematic drawing of an air cycle machine 10 in which the present invention may be employed. The usual compression cooling and expansion seen in any refrigeration cycle may be accomplished in the air cycle machine 10 by a compressor 12, an exchanger 14, and an expansion turbine 16. The work extracted by the expansion turbine 16 may be transmitted by a shaft 18 to the compressor 12. An adjustable flow turbine nozzle 20, as described in greater detail below with reference to FIGS. 2 and 3, may be located in airflow path 22 to channel air at the appropriate angle and flow volume/speed onto the expansion turbine 16. The particular angle and flow volume/speed of the airflow may vary with the size of the turbo machine (in this case, the air cycle machine 10), type of turbo machine, and the like.

While FIG. 1 describes the adjustable flow turbine nozzle 20 of the present invention used in the air cycle machine 10, the invention is not meant to be so limited. The adjustable flow turbine nozzle 20 may be useful in any turbo machine, including gas turbine engines, gas turbine generators, and the like.

Figure 2:
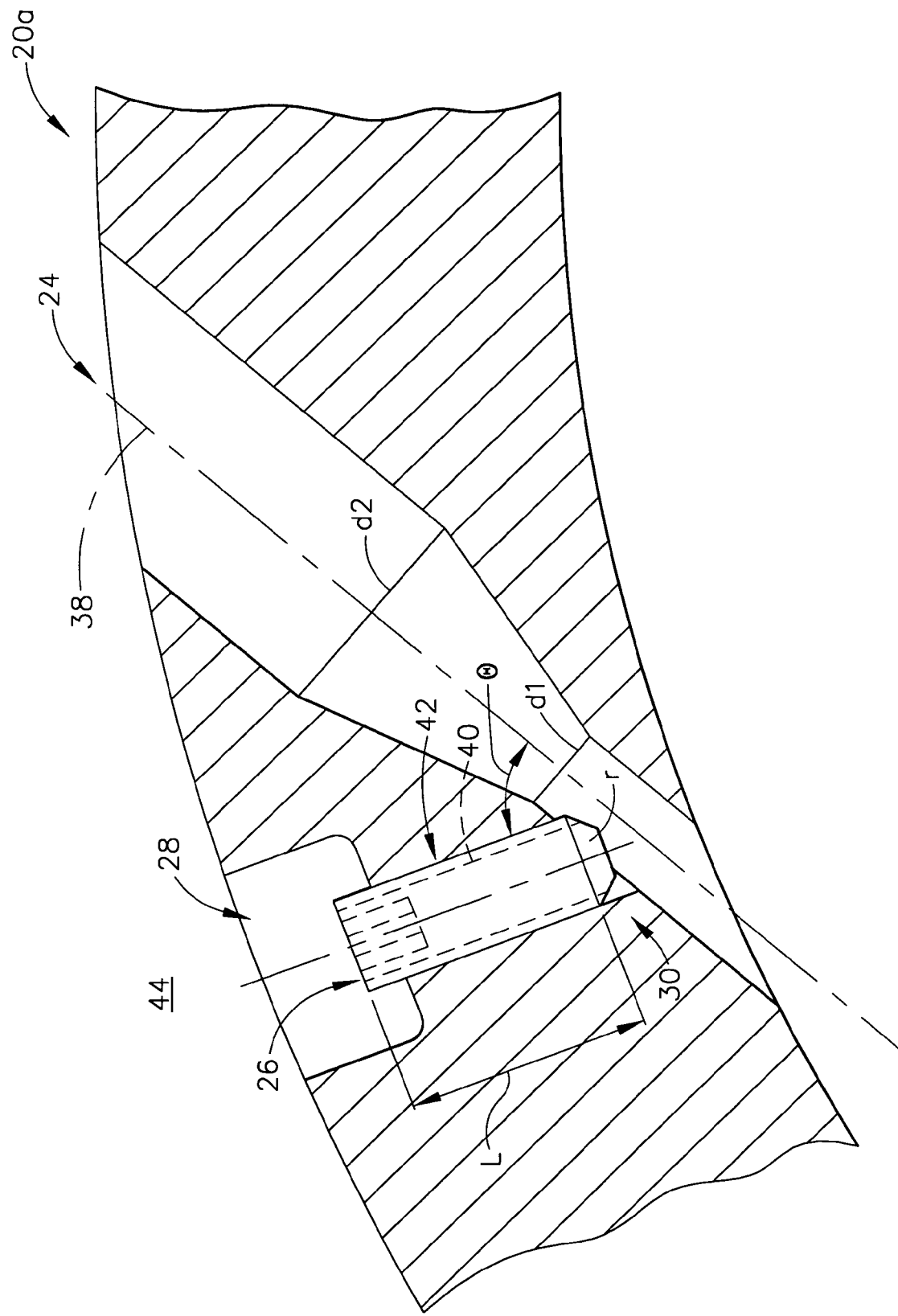
FIG. 2 is a sectional view of a drilled turbine nozzle according to an embodiment of the present invention.

Referring to FIG. 2, there is shown a sectional view of a segment of a drilled adjustable flow turbine nozzle 20a, according to one embodiment of the present invention. As discussed above, conventional drilled turbine nozzles may have a nozzle passage drilled therethrough which is brought to the correct size via an extrude honing process with, for example, clay and abrasive. This conventional process may be used to control the nozzle flow to be within the required +/−1%. This conventional process, however, requires significant rework and/or expensive manufacturing processes.

The drilled adjustable flow turbine nozzle 20a, according to one embodiment of the present invention, may have a plurality (typically from about 20 to about 60, more typically from about 40 to about 55) of nozzle passages 24 cut therethrough. The nozzle passages 24 may be formed in a single row or may be formed in multiple rows in drilled adjustable flow turbine nozzle 20a. The nozzle passages 24 may have an inlet diameter d2 that is between about 2 to about 4 times, typically between about 2 to about 3 times, an outlet diameter d1 as shown in FIG. 2. Outlet diameter d1 may vary depending on the application of the turbo machine. In the case of the air cycle machine 10 described in FIG. 1, outlet diameter d1 may range between about 1/16 to about 1/2 inch, typically between about 1/8 to about 1/4 inch.

At least one of the nozzle passages 24 may have a flow adjustment member 26, which may adjustably or controllably protrude therein to disrupt the flow of air therethrough. The flow adjustment member 26 may be, for example, a plug-like member adapted for controllable protrusion into at least one of the nozzle passages 24. The flow adjustment member 26 may partially occlude at least one of the nozzle passages 24. The flow adjustment member 26 may be disposed in the drilled adjustable flow turbine nozzle 20a by any conventional means, for example, by cross-drilling a hole 28 in the drilled adjustable flow turbine nozzle 20a to communicate an exterior 44 of drilled adjustable flow turbine nozzle 20a with one of the nozzle passages 24. The flow adjustment member 26 may fit into the hole 28 by friction fit, or, alternatively, the flow adjustment member 26 and the hole 28 may be formed with mating male threads 40 and female threads 42, respectively.

In the case where the flow adjustment member 26 and the hole 28 are threaded, a thread locking means, such as Spiroloc® or a thread locking compound may be used to prevent unintentional adjustment of the flow adjustment member 26.

The flow adjustment member 26 can vary a single nozzle passage 24 from completely closed to fully open. In the example of a 50-hole nozzle, a single flow adjustment member 26 may therefore allow for a total flow adjustment of two percent. In order to maintain an even flow of air through the drilled adjustable flow turbine nozzle 20a, thereby reducing blade vibrations, a plurality of flow adjustment members 26 may be evenly spaced circumferentially in a corresponding plurality of nozzle passages 24 of the drilled adjustable flow turbine nozzle 20a. For example, if a 2% reduction in flow is desired in a 50-hole nozzle, four flow adjustment members 26 may be placed at 90 degree intervals around the drilled adjustable flow turbine nozzle 20a, each of the four flow adjustment members 26 reducing the flow through their respective nozzle passages 24 by 25%. In other words, a desired calibration of one of the turbine nozzles 20a may achieved by providing adjustment members 26 for only about 8% to about 10% of the nozzle passages 24. If a total occlusion of one or more of the nozzle passages 24 is performed, then a desired 2% calibration can be accomplished by providing adjustment members 26 for only 2% of a total number of the nozzle passages.

The hole 28 may be drilled at an angle $\theta$ with respect to a central axis 38 of the nozzle passage 24. The angle $\theta$ may be less than 90 degrees, typically less than about 70 degrees, in order to reduce flow disturbances through the nozzle passage 24. To further reduce flow disturbances through the nozzle passage 24, the flow adjustment member 26 may have a radius r at its leading end 30. The flow adjustment member 26 may be tapered at leading end 30, as shown in FIG. 2, or the flow adjustment member 26 may have a uniform radius r along its entire length L.

The flow adjustment member 26 may be made of a material having the same hardness as the material of the drilled adjustable flow turbine nozzle 20a, thereby preventing erosion over time. The flow adjustment member 26 and the drilled adjustable flow turbine nozzle 20a may be composed of, for example, chromium nickel alloy, molychrome nickel steel, a Nimonic® alloy, or the like.

Figure 3:
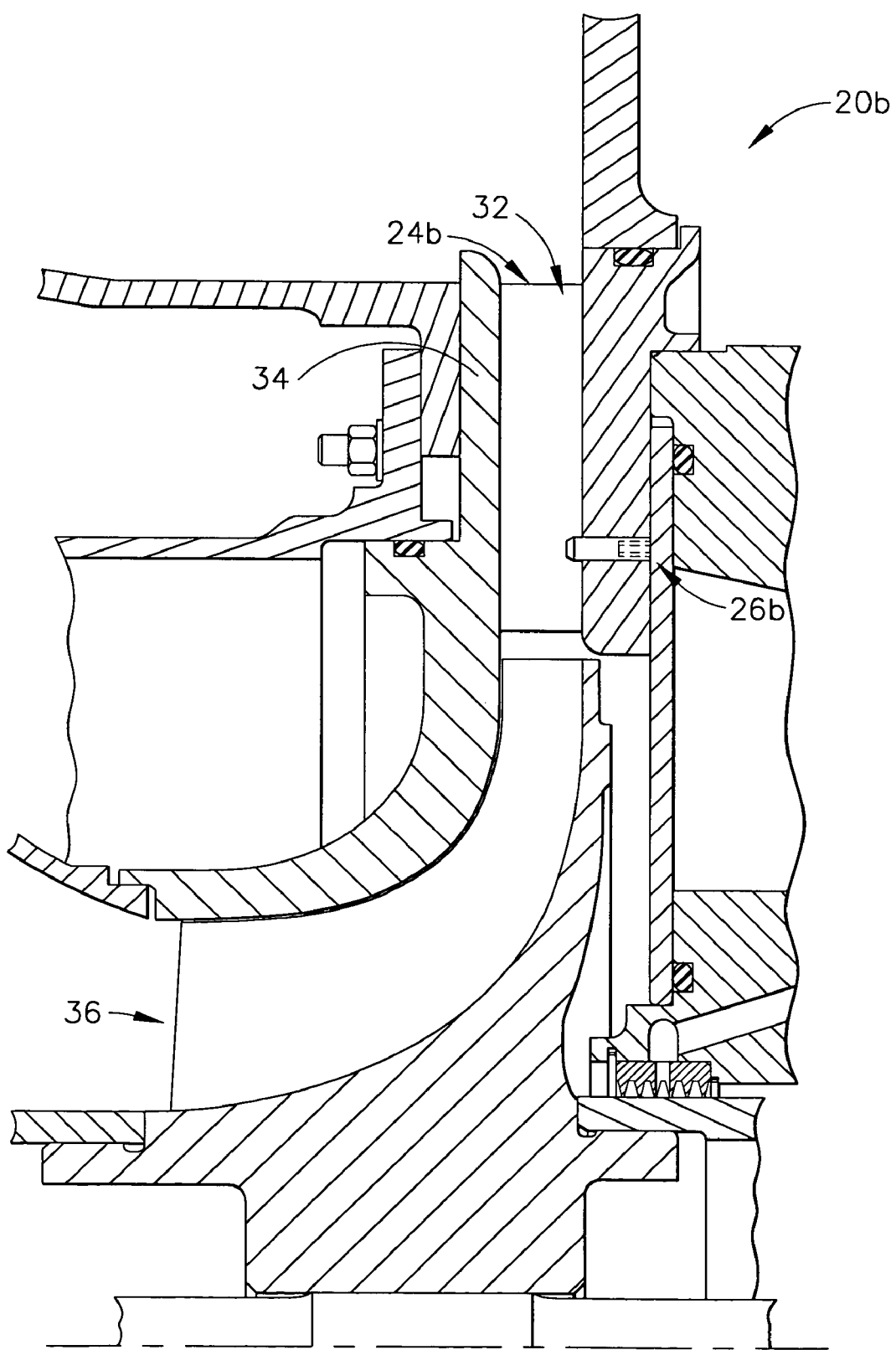
FIG. 3 is a sectional view of a vaned turbine nozzle according to another embodiment of the present invention.

Referring now to FIG. 3, there is shown a sectional view of a vaned adjustable flow turbine nozzle 20b according to another embodiment of the present invention. A flow adjustment member 26b may be placed at a throat 32 of a nozzle passage 24b to reduce the flow area between vanes 34 of vaned adjustable flow turbine nozzle 20b. The flow adjustment member 26b may function in a manner similar to that of flow adjustment member 26 as described above in reference to FIG. 2, that is, by protruding into the nozzle passage 24b to disrupt the flow of air therethrough. Airflow passing into the nozzle passage 24b may be reduced by the flow adjustment member 26b prior to exiting through a turbine wheel outlet 36.

Similar to the flow adjustment member 26 in FIG. 2, the flow adjustment member 26b may be placed in a plurality of nozzle passages 24b, equally spaced around the vaned adjustable flow turbine nozzle 20b.

As can be appreciated by those skilled in the art, the present invention provides improved turbine nozzles and methods for their use in turbo machines. A flow adjustment member is provided to regulate the flow through the turbine nozzle without requiring labor- and time-intensive reworking and/or manufacturing.

It should be understood, of course, that the foregoing relates to exemplary embodiments of the invention and that modifications may be made without departing from the spirit and scope of the invention as set forth in the following claims.

I claim:

1. A turbine nozzle for a turbo machine comprising:
a plurality of nozzle passages;
each of the nozzle passages being adapted to retain a fixed cross-sectional area when incorporated in the turbo machine; and
at least one flow adjustment member adapted for controllable protrusion in at least one of the plurality of nozzle passages, the flow adjustment member capable of providing a reduced cross-sectional area of the at least one of the plurality of nozzle passages, which reduced cross-sectional area remains fixed during operation of the turbo machine; and
wherein the nozzle passages are drilled in the turbine nozzle to provide a drilled adjustable flow turbine nozzle.

2. The turbine nozzle according to claim 1, further comprising at least two flow adjustment members, each flow adjustment member disposed within a separate one of said plurality of nozzle passages.

3. The turbine nozzle according to claim 2, wherein the at least two flow adjustment members are equally spaced about the turbine nozzle.

4. The turbine nozzle according to claim 1, further comprising male threads on the at least one flow adjustment member, the male threads mating with female threads of the turbine nozzle to allow rotational adjustment of the at least one flow adjustment member in the nozzle passages.

5. The turbine nozzle according to claim 1, wherein the at least one flow adjustment members frictionally engages a hole to allow adjustment of the at least one flow adjustment member in the nozzle passages.

6. The turbine nozzle according to claim 1, wherein the plurality of nozzle passages are about 50 nozzle passages and the number of the nozzles passages into which one of the adjustment members protrudes is about 4.

7. The turbine nozzle according to claim 1, further comprising a hole cross-drilled into the turbine nozzle, the hole communicating an exterior of the turbine nozzle with one of the plurality of nozzle passages, the hole capable of receiving one of the at least one flow adjustment members.

8. The turbine nozzle according to claim 7, wherein the hole forms an angle with the nozzle passage to which it communicates of less than 90 degrees.

9. The turbine nozzle according to claim 8, wherein the hole forms an angle with the nozzle passage to which it communicates of less than 70 degrees.

10. The turbine nozzle according to claim 1, wherein the at least one flow adjustment member is made of a material having the same hardness as a material composing the turbine nozzle.

11. A turbine nozzle for introducing a predetermined airflow to a turbine wheel of a turbo machine, the turbine nozzle comprising:
a plurality of nozzle passages circumferentially disposed around the nozzle, said nozzle passages having a predetermined composite cross-sectional area;
flow adjustment members adapted for controllable protrusion in each of at least two of the nozzle passages, the flow adjustment members capable of providing a reduction of cross-sectional area of the at least two of the plurality of nozzle passages which cross-sectional area remains fixed during the introduction of the predetermined airflow; and
wherein the at least two of the plurality of nozzle passages are equally spaced circumferentially about the adjustable flow turbine nozzle;
wherein at least two holes are cross-drilled into the adjustable flow turbine nozzle, each of the holes communicating an exterior of the adjustable flow turbine nozzle with one of the plurality of nozzle passages, the holes each capable of receiving one of the flow adjustment members; and
wherein each of the holes forms an angle with the nozzle passage to which it communicates of less than 90 degrees.

12. The adjustable flow turbine nozzle according to claim 11 further comprising male threads on the at least two flow adjustment members, the male threads mating with female threads of the adjustable flow turbine nozzle to allow rotational adjustment of the at least two flow adjustment members in the at least two of the plurality of nozzle passages.

13. The adjustable flow turbine nozzle according to claim 11, wherein the at least two flow adjustment members frictionally engage the adjustable flow turbine nozzle to allow frictional adjustment of the at least two flow adjustment members in the at least two of the plurality of nozzle passages.

14. The adjustable flow turbine nozzle according to claim 11, wherein the at least one flow adjustment member is made of a material having the same hardness as the material composing the turbine nozzle.

15. A drilled adjustable flow turbine nozzle comprising:
about 50 nozzle passages;
a flow adjustment member adapted for controllable protrusion in at least one but not more than about 4 of the nozzle passages, the flow adjustment member capable of providing an adjustable airflow through the drilled adjustable flow turbine nozzle; and
a cross-drilled hole in the drilled adjustable flow turbine nozzle, the hole communicating an exterior of the drilled adjustable flow turbine nozzle with one of the nozzle passages, the hole capable of receiving the flow adjustment member, wherein the hole forms an angle with the nozzle passage to which it communicates of less than 90 degrees.

16. The drilled adjustable flow turbine nozzle according to claim 15, further comprising at least two flow adjustment members equally spaced circumferentially about the turbine nozzle.

17. The drilled adjustable flow turbine nozzle according to claim 15, further comprising:
male threads on the at least one flow adjustment member; and
female threads on the hole, the male threads mating with the female threads to allow rotational adjustment of the at least one flow adjustment member in the nozzle passages.

18. The drilled adjustable flow turbine nozzle according to claim 15, wherein the at least one flow adjustment member frictionally fits in the hole and protrudes from the hole into the nozzle passage to allow adjustment of the at least one flow adjustment member in the nozzle passages.

19. A vaned adjustable flow turbine nozzle comprising:
about 50 nozzle passages formed as vanes on a surface of the vaned adjustable flow turbine nozzle; and
at least one flow adjustment member adapted for controllable protrusion in at least one but not more than about 4 of the vanes, each flow adjustment member capable of providing an adjustable airflow through the vaned adjustable flow turbine nozzle.

20. The vaned adjustable flow turbine nozzle according to claim 19, further comprising at least two flow adjustment members in the vanes, each flow adjustment member equally spaced about the vaned adjustable flow turbine nozzle.

* * * * *